Dec. 5, 1967     F. V. JOHNSON     3,355,953
NON-CONSTRAINED PENDULOUS GYROSCOPE FOR
INERTIAL CONTROL SYSTEMS
Filed Sept. 20, 1963     9 Sheets—Sheet 1

Inventor:
Frithiof V. Johnson,
by Dudley T. Ready
His Agent.

Inventor:
Frithiof V. Johnson,
by Dudley J. Ready
His Agent.

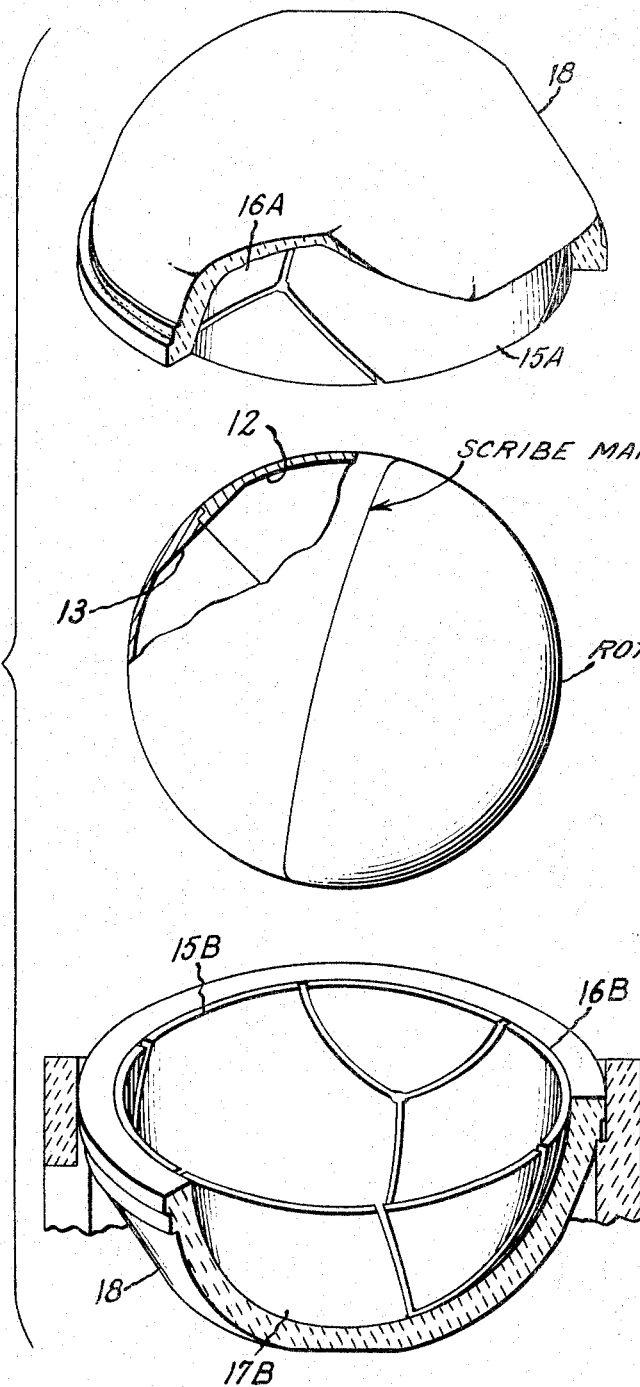

United States Patent Office 3,355,953
Patented Dec. 5, 1967

3,355,953
NON-CONSTRAINED PENDULOUS GYROSCOPE
FOR INERTIAL CONTROL SYSTEMS
Frithiof V. Johnson, Scotia, N.Y., assignor to General
Electric Company, a corporation of New York
Filed Sept. 20, 1963, Ser. No. 310,309
5 Claims. (Cl. 74—5)

This invention relates to a novel linear acceleration sensing instrument of the pendulous gyroscope class. It is particularly useful in pairs with appropriate computer apparatus to provide precise position information in a body-bound inertial navigation system.

Most inertial navigation systems have been of the stable platform type wherein an instrument supporting platform in the vehicle is maintained with a predetermined attitude relative to inertial space. Attitude sensing instruments such as gyroscopes and star trackers are used for stabilizing the platform and linear motion sensing instruments fixed relative to the stable table provided acceleration and velocity signals from which a log of vehicle position is produced. The stable platform approach generally requires a three coordinate gimbal system and precision servomechanism apparatus to orient the platform. The alternative approach of the "body-bound" or "strapped-down" instrumentation type has the acceleration and attitude sensing instruments mounted directly on a vehicle deck, usually fixed, in any convenient location or locations. Instead of a physical inertial space reference in the form of a stable table, instrumentation is provided to measure the vehicle attitude continuously so that linear acceleration measurements are resolved in respect to an inertial space coordinate system in appropriate computer apparatus. In some respects, the body-bound approach can be considered to replace standard stable platform structure with computing apparatus.

Any inertial approach is obviously dependent upon the accuracy of the sensing instruments measuring vehicle motion. As is well known, the accuracy of inertial guidance systems and other dead reckoning systems is a function of the operating time. This is true in any system operating without references for measurement of errors. It is not so obvious that the data processing procedure has an important effect on the relationship between measurement errors and output information errors.

In an inertial guidance system in which the linear motion is sensed by accelerometers that provide output signals representing linear acceleration of a vehicle for a particular inertial coordinate, it is necessary to perform two time integrations to obtain displacement information. For continuous operation, velocity data is produced by continuous integration of the accelerations and the resulting velocity data is integrated to provide the vehicle displacement data. Errors in the measurement of acceleration are stored in the velocity data and tend to result in continuously increasing error in the displacement information as long as the vehicle guidance system operates. In some respects, this problem can be reduced by utilizing accelerometers which produce output signals representing velocity by precision integration being made an inherent function of the instrument. Such an instrument may be more properly called a velocimeter, but it is commonly considered an accelerometer where it is directly responsive to vehicle accelerations to accurately and continuously provide the required information on vehicle motion.

A major source of errors in inertial guidance systems is that linear motion must be properly related to the coordinate axes of the system. In a stable platform system, the problem is basically one of keeping the platform stable, which aims at keeping the errors low in assigning directions to the acceleration measurements by maintaining small departures of the platform from its assigned inertial orientation. In a body-bound system, the linear measurements are related to inertial space by trigonometric functions having values which in general are continuously varying. This makes the performance of the apparatus for determining vehicle attitude particularly critical and when this apparatus samples information at discrete time intervals, the sampling rate becomes a critical factor.

A number of different kinds of instruments for measuring linear acceleration have been devised. These include pendulous or rotational types as against linearly moving seismic masses, and instruments having electromagnetic measuring constraints as against mechanical or gyroscopic constraints. The accelerometers most closely related to the invention are the integrating, floated, single-axis (or single-degree-of-freedom) pendulous gyroscopes. In a body-bound inertial system, probably the most striking problem encountered with these gyroscopes is that they integrate in respect to the vehicle coordinates and therefore are absolutely dependent upon the accuracy of vehicle attitude data relative to inertial space and the transformation calculations. If there is error in either of these areas or in the pendulous gyroscope read-out data, a system error results.

The constraints that cause a conventional single-axis gyroscopic accelerometer to measure components of acceleration along specific axes must apply forces to the sensing element to maintain single axis operation. This results in an increase in "uncertainty" forces or torques. Because rotatable structures have mechanical play and finite stiffness, uncertainties exist as to the actual orientations of the axes and the directions of applied forces. While these problems have long been studied, the isolation and identification of the origin of these errors is extraordinarily difficult, complex, and expensive. It requires experimental and theoretical study of the highest order. In adapting electromagnetic suspension, that is, an electrostatically or magnetically suspended gyroscope to measure acceleration for a single axis, the direct mechanical bearing is eliminated. Nevertheless, some uncertainty forces remain. While the accuracy problems are greatly reduced in these types of gyroscopes so that attitude measurements can be accurately made, the measurement of acceleration cannot be made with the same accuracy. Whenever constraints are introduced in a gyroscope, of any kind, to align the spin axis for the purpose of establishing sensing directions, sources of performance errors are also introduced.

One major problem facing body-bound systems is that they require instruments to operate over an extremely wide range of measurement values. At a given time, the system may have to measure a roll rate many millions of times the lowest steady rate that must be sensed. When all the major factors are considered, including the required measurement accuracy, the complexity inherent in body-bound inertial calculations, and the errors introduced by incremental digital computation techniques or the equivalent, accurate body-bound navigation is a formidable problem.

It is an object of the invention to provide a precision pendulous gyroscope in which the errors resulting from alignment constraints introducing "uncertainty" forces, etc., are obviated.

It is also an object of the invention to provide an inertial navigation system for which useful accuracy is not critically dependent upon the continuous transformation of linear motion data from body-bound coordinates to inertial coordinates.

It is another object of this invention to provide an inertial guidance system which does not critically depend upon the frequency of measurements of attitude variables to insure long term accuracy.

It is another object of the invention to provide a pendulous gyroscope accelerometer of the magnetic and electrostatic suspension types in which errors in reading of output are not propagated or accumulated as permanent errors in velocity.

It is another object of the invention to provide an accelerometer in which accuracy is not dependent on standards of voltage, current, or magnetic field, but only on time.

Briefly stated, in accordance with primary aspects of the invention, it has been discovered that a pendulous gyroscope need not have its spin axis constrained to operate as a useful accelerometer.

Furthermore, two identical nonconstrained pendulous gyroscopes can give a unique description of motion. It has been further determined that two such gyrscopes having the same scale factors and having their spin axes displaced will maintain their initial separation and will operate so as to always present appropriate data. The velocity information of the system during a given time period is effectively independent of prior determinations of acceleration and attitude because a non-constrained gyroscope operates relative to inertial coordinates. Since the gyroscopes are not constrained to measure along a specific single axis, they are free from errors produced by forces constraining them to single-axis operation and extraneous acceleration forces along axes perpendicular to the measuring axis.

These and other objects of the present invention will become apparent from the accompanying detailed description and drawings in which:

FIGURE 1C is an exploded view in perspective of parts of the FIGURE 1A gyroscope.

*Pendulous electrostatic gyroscope embodiment*

Figure 1A:
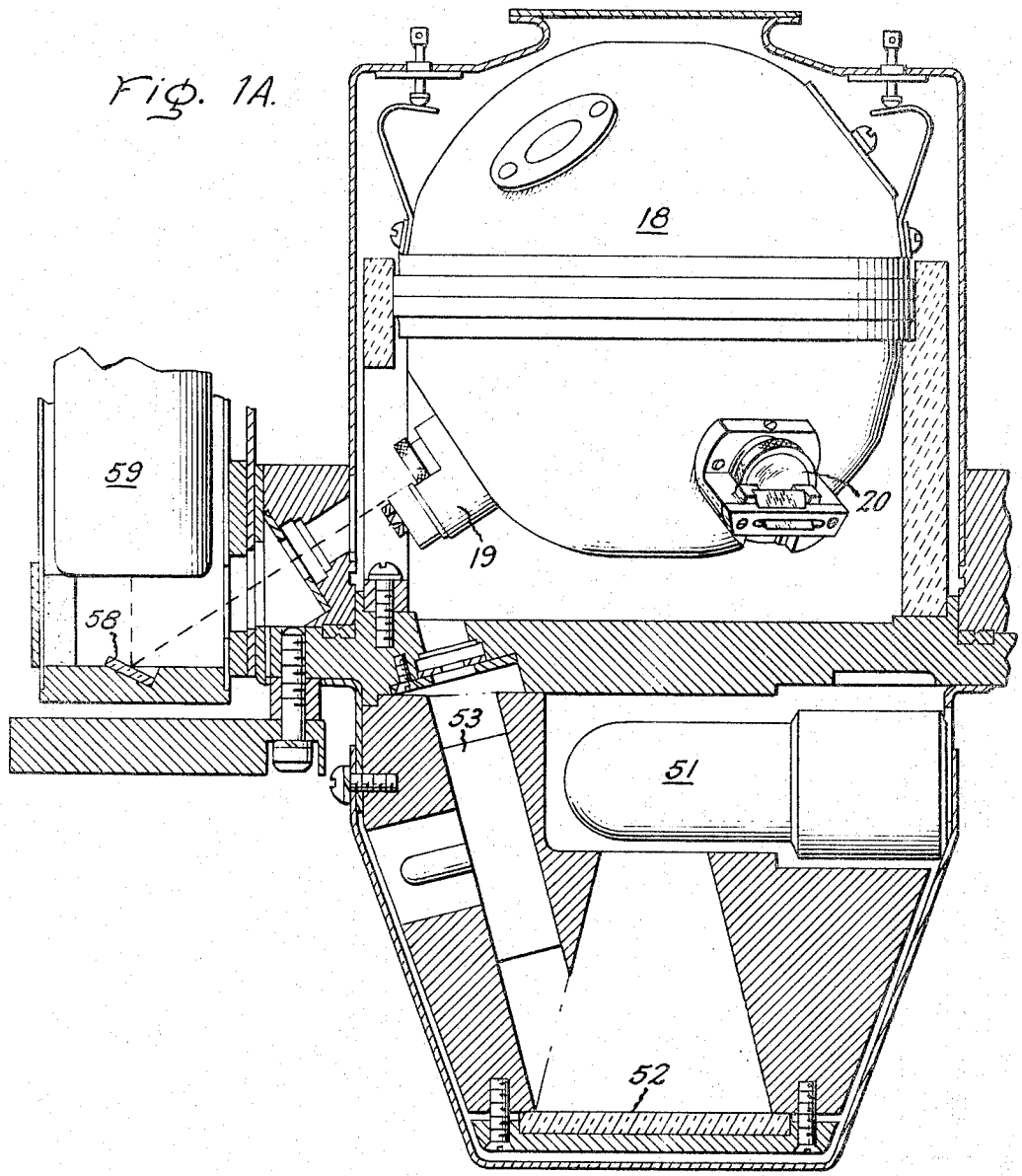
FIGURE 1A is a cross section in elevation of one embodiment of the novel pendulous gyroscope.
Figure 1B:
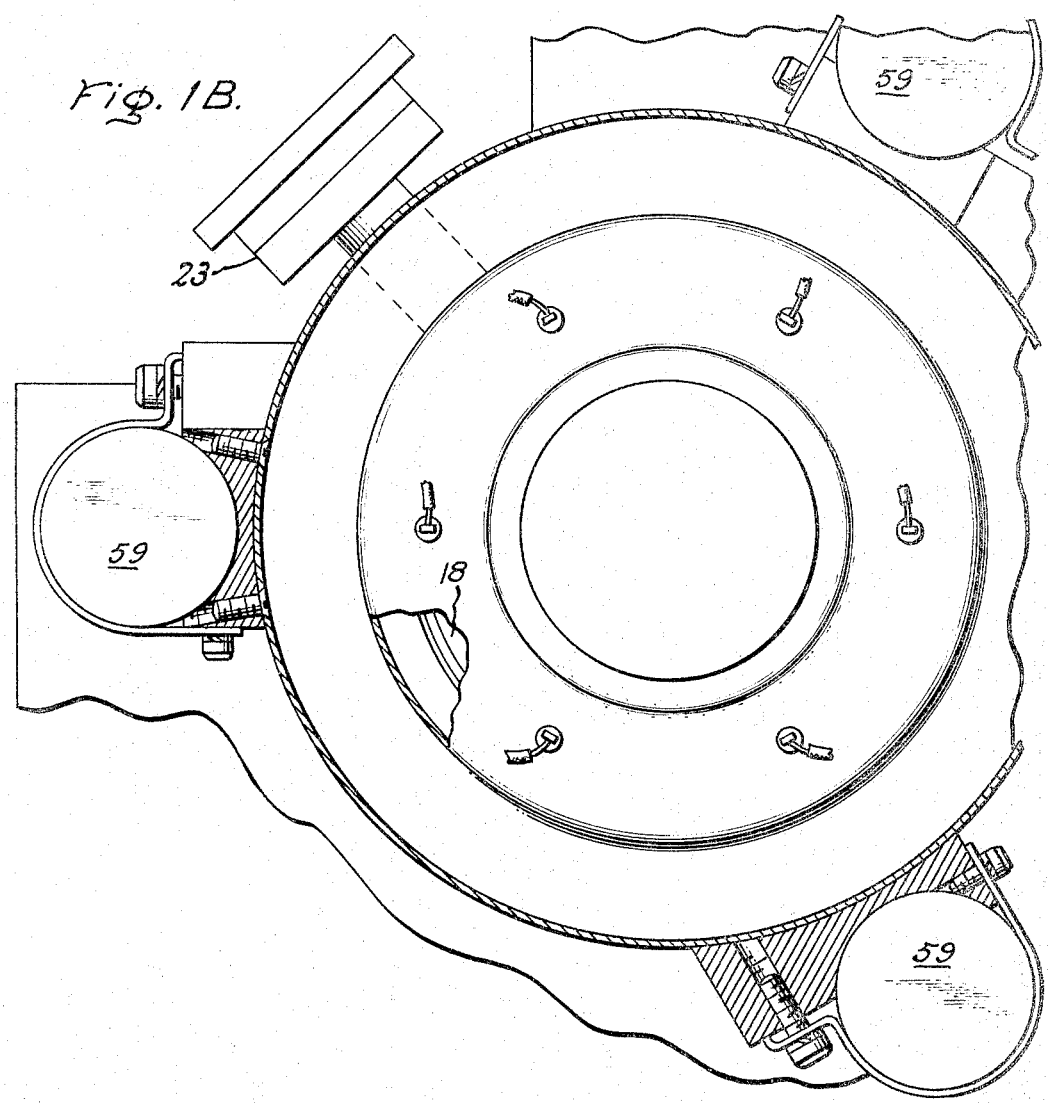
FIGURE 1B is a plan view of the FIGURE 1A pendulous electrostatic gyroscope.

Referring now to the drawings, FIGURES 1A–1C illustrate a preferred embodiment of the novel acceleration sensing instrument basic to the invention. This accelerometer is a modification of an existing type of gyroscope which has a spherical rotor electrostatically suspended for free rotation, to provide the electromagnetic suspension. The distinctive features are primarily in the pendulous construction and in the angularly non-constrained mode of operation.

Figure 5:
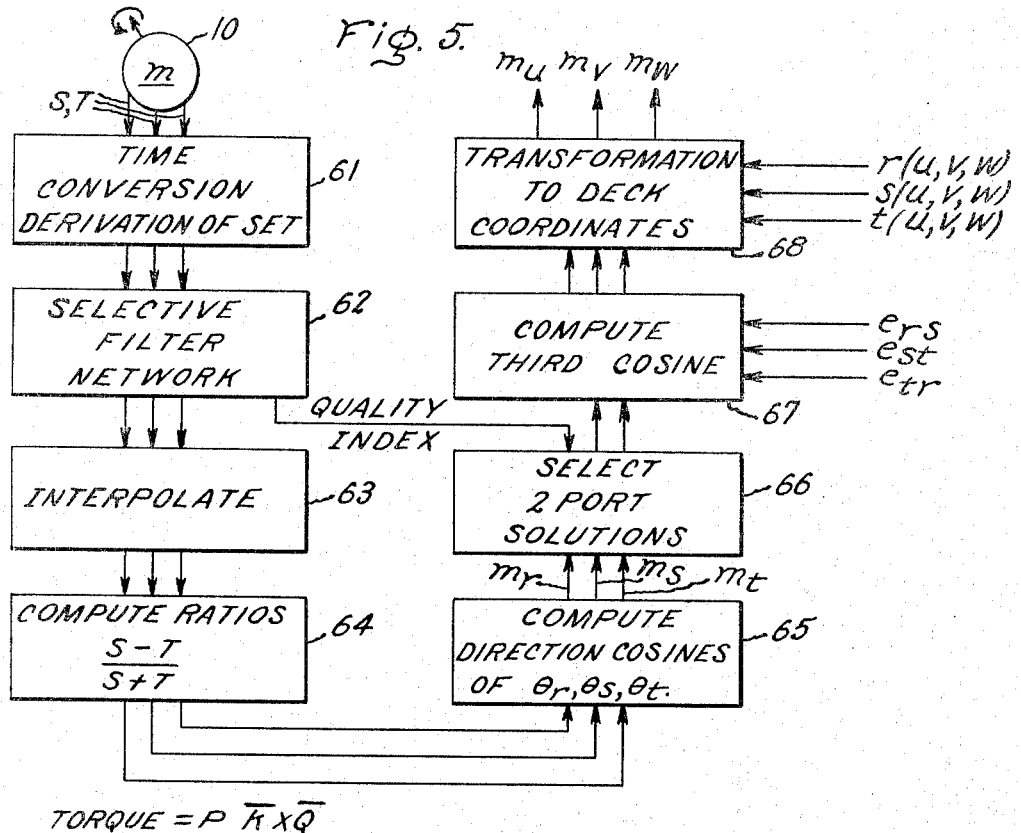
FIGURE 5 is a flow diagram illustrating the data processing steps in converting the optically read signals into appropriate direction cosine data for the FIGURE 1A pendulous gyroscope.

The rotor 10 is a hollow metallic sphere having a pendulous mass unbalance provided by a pendulous half 12 having its shell uniformly thicker on the inside surface of the rotor. The rotor 10 also has an inwardly extending ring 13 at its equator to establish a preferred spin axis. For the purpose of reading-out the rotor position, line 14 is scribed on the outer surface of rotor 10 in the form of a great circle which intersects the equator at a typical angle of 60°. The rotor 10 is suspended electrostatically by three pairs of opposed electrode plates, 15A, 15B, 16A, 16B, 17A, and 17B which conform to the spherical shape of the rotor. These electrodes overlie as much of the rotor surface as possible with a very small gap, typically 0.001 inch, and are symmetrically spaced so that the next electrostatic forces of each pair are orthogonal. Support for the electrodes is provided by a spherical ceramic housing 18 on which three nearly orthogonal optical heads 19, 20 and 21 are also mounted for reading out the rotor position. To reduce friction, the housing 18 is evacuated by a pump 23. This usually permits the gyroscope to operate in a coasting mode. The rotor 10 is initially given a large angular momentum by an external coil (not shown) which produces a spin about the preferred spin axis. Electronic circuits for providing the suspension signals to electrodes 15A, 15B, 16A, 16B, 17A, 17B and for processing the readout signals from optical heads 19, 20, 21 are indicated by FIGURES 2 and 5 respectively.

Figure 2:
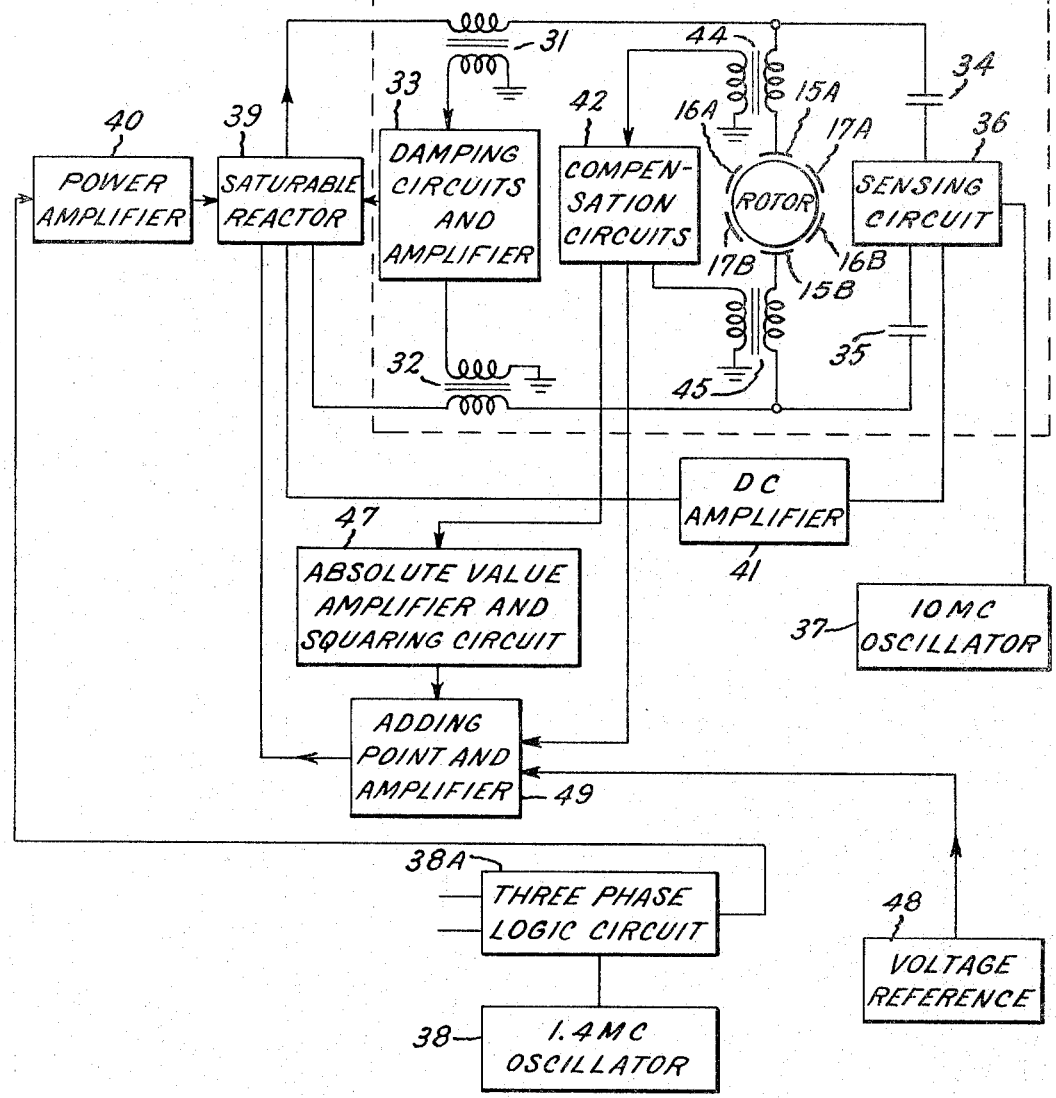
FIGURE 2 is a partially schematic and block diagram of a suitable circuit for generating control to suspend the gyroscope rotor in FIGURE 1A.

FIGURE 2 is a block diagram of one form of electrostatic rotor suspension circuits for one axis suitable for the gyroscope of FIGURES 1A–1C. The suspension consists of a passive resonant system and an active system acting in parallel to provide high reliability.

The passive system is a tuned resonant circuit formed by the capacitance of rotor 10 with each pair of electrodes 15A, 15B, etc. and a pair of balanced inductances in the form of transformers 31 and 32. The circuit is driven at a frequency close to but higher than resonant frequency $f_0$, so that the system produces the correct force gradient to hold the rotor in the center of the electrodes. If the rotor moves closer to one electrode, the voltage on that electrode will decrease, and the voltage on the opposite electrode will increase so as to tend to center the rotor. The supply voltage is derived from a 1.4 mc. oscillator 38 feeding a logic circuit 38A which divides the frequency and separates it into three phases for the three orthogonal suspension systems. In order to damp the oscillations of this resonant suspension, the suspension currents are measured by the secondary windings of transformers 31 and 32, rectified, and fed through filter networks to the saturable reactor 39, through which they modify the suspension currents.

The active suspension portion senses the displacements of the rotor through an impedance bridge comprised primarily of the capacitance of the suspension gaps and two inductances in the sensing circuit 36. This circuit is supplied with signal power from 10 mc. oscillator 37. Capacitances 34 and 35 serve to isolate the sensing circuits from the high suspension voltages. The output of the sensing circuit is amplified in DC amplifier 41, where it also is modified by an integrating filter. The output of the amplifier is also applied to the saturable reactor 39 to control the suspension currents. In order to minimize the torques produced by non-sphericity of the rotor, it is desirable to control the energy stored in the suspension gaps, so that it will be independent of the acceleration loads and also of variations in gap and in electrical characteristics of the three suspension systems.

This is done by compensation circuits 42 which receive measures of the suspension currents through transformers 44 and 45. In these circuits the sums and differences of the currents are taken. The sum is applied to a squaring circuit 47, the output of which is compared with a reference voltage from reference source 48 in the adding point amplifier 49. The difference is also applied to the adding point amplifier 49, and the resulting DC voltage is fed to the saturable reactor 39 to control the suspension voltages.

Figure 3:
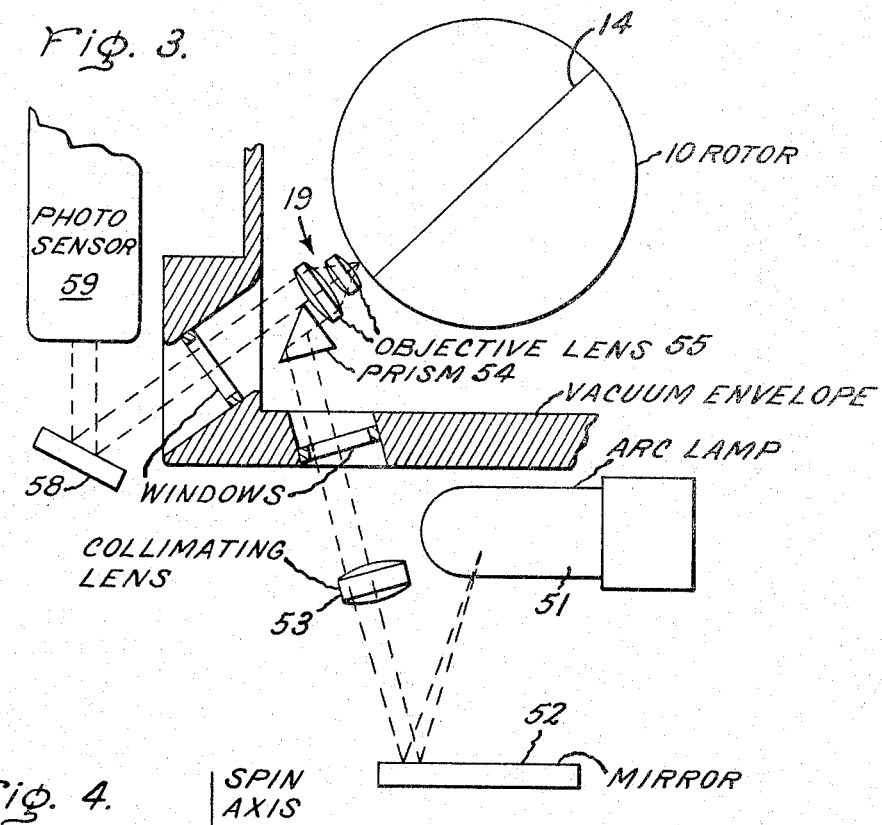
FIGURE 3 is a diagram illustrating details of the FIGURE 1A optical read-out system operation.

FIGURE 3 is a diagram illustrating one form of read-out optics for one port of the pendulous electrostatic gyroscope. A common lamp 51 having a small incandescent arc or filament is viewed by all three optical systems with a folding mirror 52. The light is approximately collimated by lens 53 and reflected into the read-out port by a half aperture prism 54. A microscope type objective lens 55 forms a demagnified image on the surface of rotor 10 which has a matte or diffusing character whereby only a small part is reflected back through the objective lens. However, the scribe mark 14 is given a specular surface which reflects much more of the light back through objective lens 55 where it is collimated. This light is delivered to a light sensor 59 such as a phototransistor or a photomultiplier tube which produces pulses in electrical form corresponding to crossings of scribe mark 14 past the read-out port.

Figure 4:
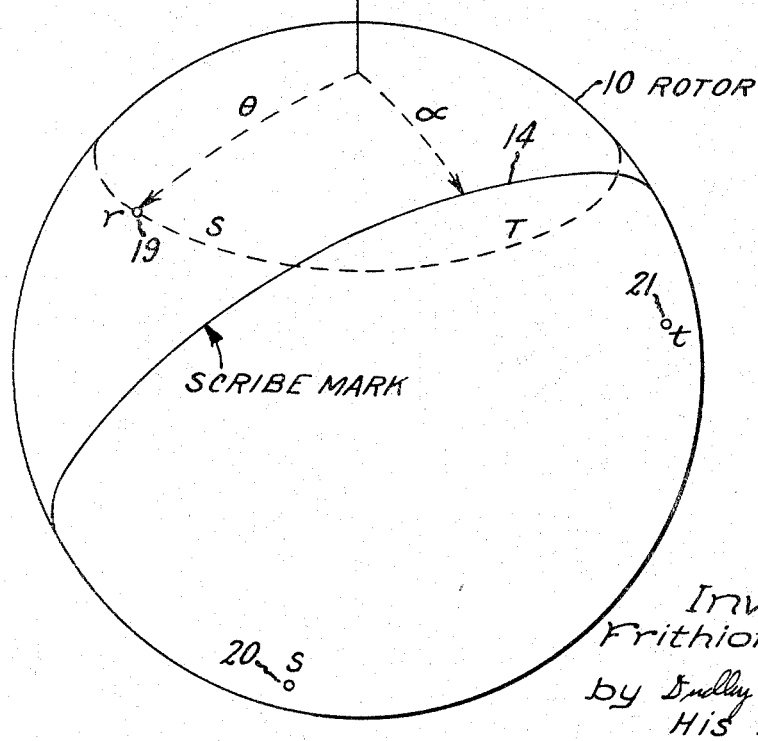
FIGURE 4 is a geometrical diagram illustrating the relationship between the FIGURE 1A rotor and its housing.

FIGURE 4 is a diagram of the relationships between the rotor 10, its spin axis, the read-out ports 19, 20 and 21 respectively designaed $r$, $s$, and $t$, and the rotor scribe mark 14 for illustrating the read-out operation. The function involved is simply to measure the orientation of the rotor polar or spin axis relative to the housing 18. In practice, this function tends to be rather complex when implemented with high accuracy. In the particular scheme illustrated, advantage is taken of the geometrical relationships whereby the direction of the spin axis is completely defined by the direction cosines, such as $\cos \theta_r$, to any two ports. The direction cosines can be measured by timing the intervals S and T between crossings of the scribe mark 14 past the respective read-out ports. If a read-out port axis is perpendicular to the rotor spin axis (i.e. at the rotor equator, $\theta = \pi/2$), the ratio of time intervals S and T between scribe crossings is one. As $\theta$ increases or decreases, the ratio of S to T respectively increases or decreases. The relationships are such that:

$$\cos \theta = \frac{\sin \frac{(S-T)\pi}{(S+T)2}}{\sqrt{\sin^2 \frac{(S-T)\pi}{(S+T)2} + \tan^2 \alpha}} \quad (1)$$

In practice, $\alpha$ is less than $\pi/4$ and, for each particular rotor, $\tan \alpha$ is determined in a calibration test and stored in the computer. In those situations where $\theta < \alpha$, for a particular port, no read-out signals are generated. However, as long as the smallest angle between any two read-out axes is greater than $2\alpha$, there will always be two read-out signals generated from which the spin axis direction relative to the housing can be determined.

FIGURE 5 is a flow diagram illustrating a preferred form of a data processing circuit to generate electrical output signals for the FIGURE 1 pendulous gyroscope. The first step is to derive computer signals from the signals generated by the gyroscope rotor 10 at the read-out ports 19, 20, 21 ($r$, $s$, $t$). In block 61 pulses generated by scribe mark 14, after pulse shaping, are used to gate signals from a timer (a counter driven by a stable high frequency oscillator) for deriving digital signals, and coding signals are added to identify the particular gyroscope and the particular read-out port. Usually it is desirable to utilize a memory to record the input data over a few cycles and provide a continuous digital data updating.

Selective filter block 62 passes the input signal to the conversion circuits and insures that appropriate signals are provided for computation. The primary functions are to identify spurious inputs, to fill in missing signals, and to detect a condition where a read-out port is not producing input data. In practice, it is usually preferred to pass all data signals but to modify them where necessary by what is essentially a filtering process. In addition, the selective filter network 62 produces signals for choosing computer solutions from the best data by the use of quality index signals derived from the filtering operation. The characteristics of the filtering operation are tailored to the performance of the particular type of gyroscope used.

The quality index signals from selective filter network 62 will represent this operation and if there is better data available from this inherently redundant system, the better data will be selected at a later stage.

Interpolation block 63 modifies the read-out data to produce synchronization. With the read-out system preferred, data is in digital form and calculations are performed at discrete points in time. For accurate operation, it is necessary that the data samples be synchronized to obviate errors caused by changes in the variables and changes in the read-out port positions as the latter move with the vehicle deck. Because the read-out operations are inherently asynchronous, interpolations are made on the input data signals. In FIGURE 5, this is done on the quantities S and T, but interpolation can be done at any point up to and including the computation of direction cosines.

The ratio computer block 64 performs the simple algebraic calculations, $$S-T/S+T$$

with the read-out data signals S and T to provide a convenient quantity for computing the direction cosines. The direction cosine computer block 65 then solves for the respective direction cosines of $\theta_r$, $\theta_s$, $\theta_t$ by implementing Equation 1.

The selection from two read-out ports made in block 66 is necessary for a variety of reasons including the fact that when a read-out port is near a rotor spin axis pole $\theta < \alpha$, only two measured solutions are available. The process leading to the solution of the three direction cosines $\theta$ of the rotor spin axis are essentially independent so that the selection of solutions can also be made on the basis of various factors to utilize the most accurate data. The third cosine computer block 67 receives calibrated inputs $e_{rs}$, $e_{st}$, $e_{tr}$ which are signals representing the known direction cosines between the read-out portaxes and derives the direction cosine for the read-out port not selected.

Finally, the transformation block 68 provides a coordinate transformation from the coordinate system of the read-out head axes (generally not orthogonal) to the chosen orthogonal system for the vehicle deck axes $u$, $v$, $w$. For a pendulous electrostatic gyroscope, these signals are essentially the inputs to the inertial navigation computer. For a balanced electrostatic gyroscope, these signals are essentially the equivalent of any two-axis gyroscope output.

Figure 6:
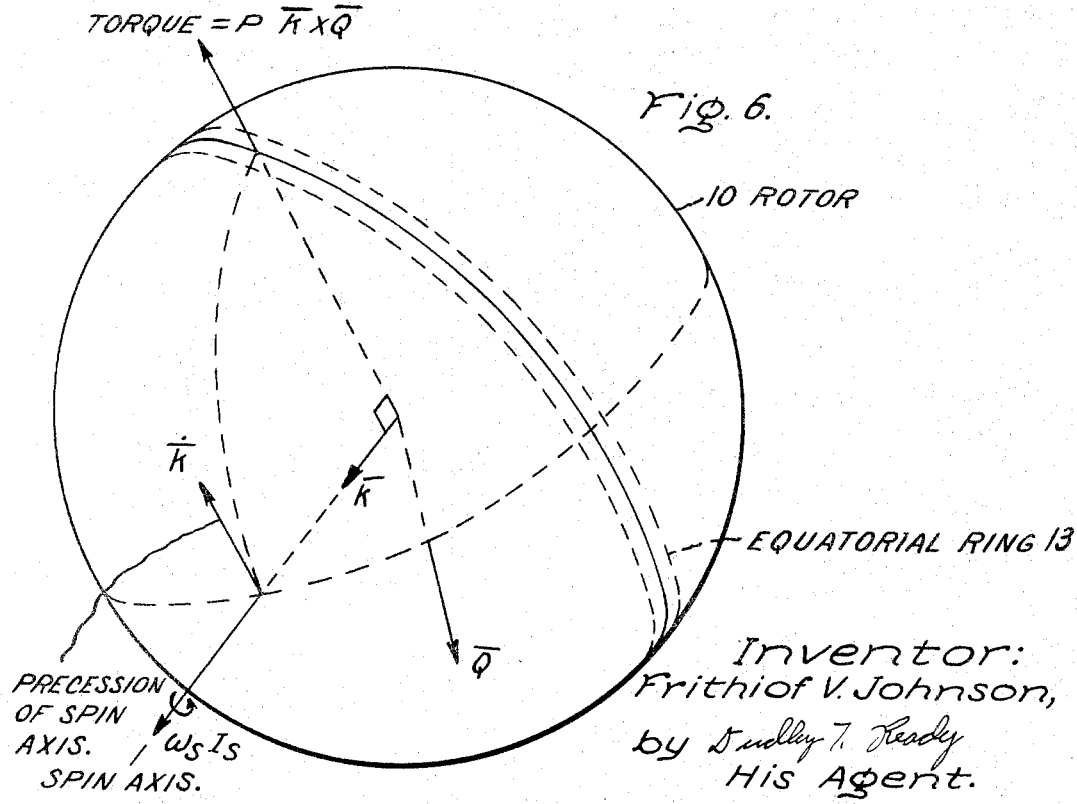
FIGURE 6 is a diagram illustrating the vector relationships and the FIGURE 1A rotor response to acceleration forces.

FIGURE 6 is a vector diagram illustrating the response of the rotor 10 of the FIGURE 1 pendulous gyroscope to specific force Q, which is the vector sum of gravitation $\overline{G}$ and the rate of change of inertial velocity $d\overline{V}/dt$. (The lines over the letters indicate vector quantities.)

$$\overline{Q} = \overline{Q} - \frac{d\overline{V}}{dt}$$

and for a small time increment, $\Delta t$, $\Delta \overline{Q} = \overline{G}\Delta t - \Delta \overline{V}$.

Because the shell of rotor 10 has one hemisphere thicker than the other, it has a pendulous moment P determined by this mass element (12). In FIGURE 6, the illustrated quantities are:

$L = \omega_s I_s =$ magnitude of angular spin momentum
      $=$ scalar product of spin velocity and moment of inertia about the spin axis
$\overline{k} =$ unit vector along the spin axis
$P =$ pendulous moment magnitude Therefore, the torque on rotor 10 produced by the specific force $\overline{Q}$ is the vector cross product, $P\overline{k} \times \overline{Q}$, which is a torque that tends to cause a rotation of rotor 10 about the axis perpendicular to the plane containing the spin axis $\overline{k}$ and the specific force $\overline{Q}$.

The time rate of change of angular momentum of a rigid body is equal to the applied torque. Therefore the equation for precession is:

$$P\bar{k} \times \bar{Q} = \frac{d}{dt}(L\bar{k} + J\bar{k} \times \dot{\bar{k}})$$

$$= L\dot{\bar{k}} + J\bar{k} \times \ddot{\bar{k}}, \text{ (because, } \dot{L} = \bar{k} \times \dot{\bar{k}} = \dot{J} = 0)$$

$$= \omega_s I_s \dot{\bar{k}} + J(\bar{k} \times \ddot{\bar{k}}) \quad (1)$$

with the result that the spin axis $\bar{k}$ precesses at a rate $\dot{\bar{k}}$ proportional to the specific force, under equilibrium conditions. The last term represents the contribution of the rate of change of the portion of angular momentum due to the precession angular velocity of the rotor about an equatorial axis and the moment of inertia $J$ about that axis. It is the inertia opposition to applied torque analagous to the $m\ddot{x}$ term in linear motion. When nutation is small, this term is relatively negligible because the spin velocity $\omega_s$ is made very large. Accordingly, it is omitted in the following equations, but can be included in the system mechanization when significant.

The overall effect is that the component of the applied specific force $\bar{Q}$ in the equatorial plane of the rotor produces precession $\dot{k}$ of the rotor spin axis about this equatorial component vector. The rotor is insensitive to specific force components parallel to the rotor spin axis.

However, two pendulous gyroscopes having their spin axes perpendicular will always have at least one responsive to any specific force. It has been discovered that if the pendulous gyroscopes have the same scale factors (i.e., produce equal amplitude responses to corresponding specific forces), they will maintain their initial separation and provide signals from which a log of position can be maintained in conjunction with suitable attitude measuring instruments. A more inclusive statement is that if the projections of a vector (Q) in two non-parallel planes are known, then the vector (Q) is completely defined. The gyroscopes do not have to be perpendicular—it is sufficient that their spin axes be non-parallel.

If the two pendulous gyroscopes are identified by the subscripts 1 and 2, the precession equation are:

$$\dot{\bar{k}}_1 = \left(\frac{P_1}{L_1}\right)(\bar{k}_1 \times \bar{Q}) \quad (2)$$

$$\dot{\bar{k}}_2 = \left(\frac{P_2}{L_2}\right)(\bar{k}_2 \times \bar{Q}) \quad (3)$$

In terms of inertial coordinate unit vectors, $\bar{x}, \bar{y}, \bar{z}$, and the direction cosines $k$'s:

$$\bar{k}_1 = k_{1x}\bar{x} + k_{1y}\bar{y} + k_{1z}\bar{z}$$
$$\bar{k}_2 = k_{2x}\bar{x} + k_{2y}\bar{y} + k_{2z}\bar{z}$$

also, $$\bar{Q} = Q_x\bar{x} + Q_y\bar{y} + Q_z\bar{z}$$

and, since $\dot{\bar{x}} = \dot{\bar{y}} = \dot{\bar{z}} = 0$, $\dot{\bar{k}}_1 = \dot{k}_{1x}\bar{x} + \dot{k}_{1y}\bar{y} + \dot{k}_{1z}\bar{z}$, the time rate of change of the unit vectors along the rotor spin axes in inertial coordinates are for respective $\bar{x}, \bar{y}, \bar{z}$ components:

$$\dot{k}_{1x}\bar{x} = \frac{P_1}{L_1}(k_{1y}Q_z - k_{1z}Q_y)\bar{x}$$

etc. for $\bar{y}$ and $\bar{z}$.

$$\dot{k}_{2x}\bar{x} = \frac{P_2}{L_2}(k_{2y}Q_z - k_{2z}Q_y)\bar{x}$$

Separating the specific force Q into gravitational and acceleration ($\Delta V$) parts and expressing the relations in differential form yields:

$$\Delta k_{1x} = \frac{P_1}{L_1}[k_{1y}(G_z\Delta t - \Delta V_z) - k_{1z}(G_y\Delta t - \Delta V_y)]; \text{ etc.}$$

$$\Delta k_{2x} = \frac{P_2}{L_2}[k_{2y}(G_z\Delta t - \Delta V_z) - k_{2z}(G_y\Delta t - \Delta V_y)]; \text{ etc.}$$

In rearranged form:

$$k_{1z}\Delta V_y - k_{1y}\Delta V_z = \frac{P_1}{L_1}\Delta k_{1x} + (k_{1z}G_y - k_{1y}G_z)\Delta t$$

$$-k_{1z}\Delta V_x + k_{1x}\Delta V_z = \frac{L_1}{P_1}\Delta k_{1y} + (k_{1x}G_z - k_{1z}G_x)\Delta t$$

$$k_{1y}\Delta V_x - k_{1x}\Delta V_y = \frac{L_1}{P_1}\Delta k_{1z} + (k_{1y}G_x - k_{1x}G_y)\Delta t$$

$$k_{2z}\Delta V_y - k_{2y}\Delta V_z = \frac{L_2}{P_2}\Delta k_{2x} + (k_{1z}G_y - k_{2y}G_z)\Delta t$$

$$-k_{2z}\Delta V_x + k_{2x}\Delta V_z = \frac{L_2}{P_2}\Delta k_{2y} + (k_{2x}G_z - k_{2z}G_x)\Delta t$$

$$k_{2y}\Delta V_x - k_{2x}\Delta V_y = \frac{L_2}{P_2}\Delta k_{2z} + (k_{2y}G_x - k_{2x}G_y)\Delta t$$

These are the basic equations for the computation of vehicle velocity. Except for the $\Delta V$ components, all the remaining quantities are measured, stored or constant quantities. (It is normal to store in a mathematical gravitational model and generate the gravity quantities.)

Figure 7:
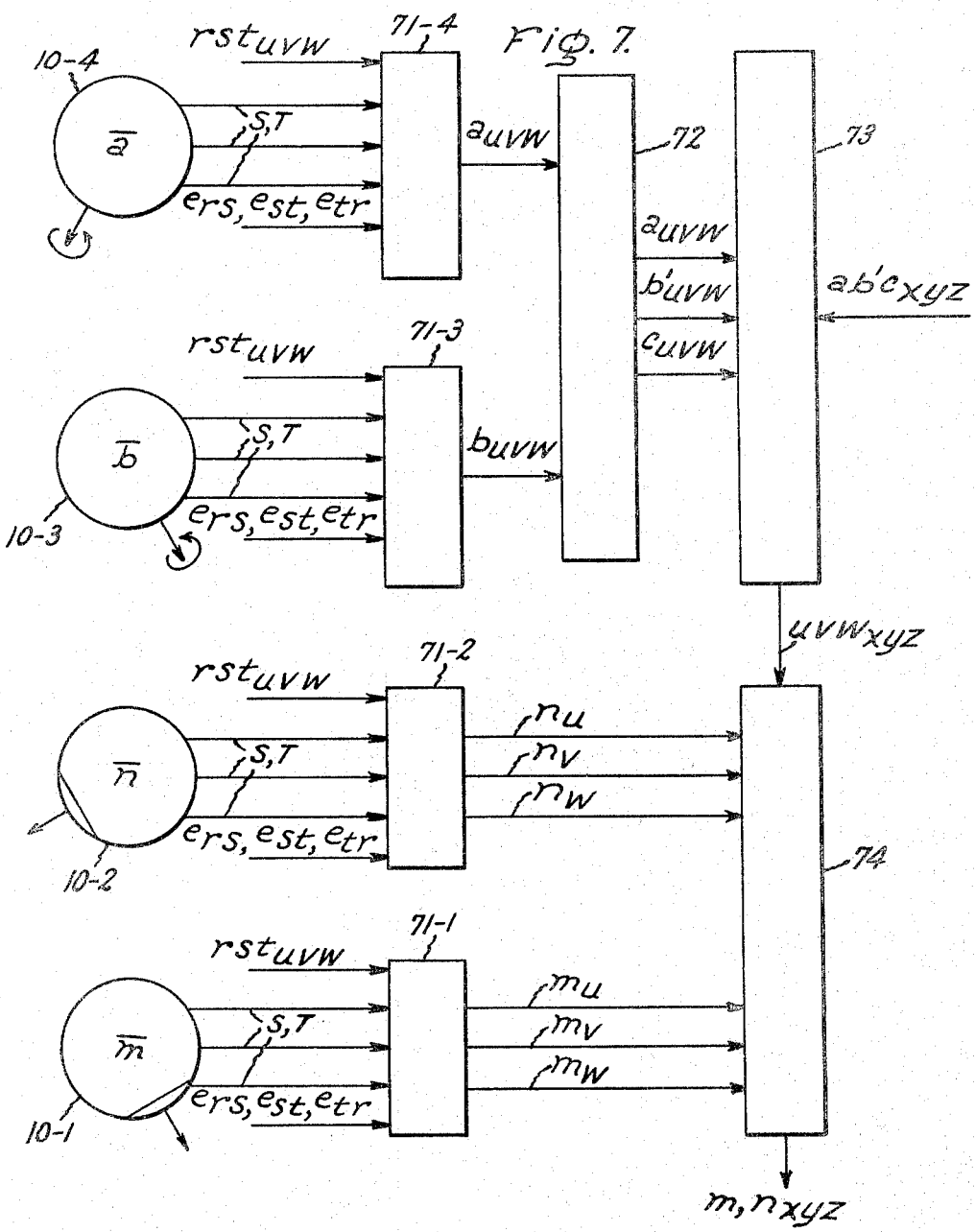
FIGURE 7 is a block diagram of sensors for a body-bound inertial navigation system utilizing a pair of pendulous gyroscopes such as illustrated in FIGURE 1A and a pair of similar balanced two-axis gyroscopes.

FIGURE 7 is a block diagram of an inertial navigation system input source which utilizes a pair of pendulous gyroscopes, having respective rotors 10–1 and 10–2, and a pair of balanced gyroscopes, having respective rotors 10–3 and 10–4. The pendulous gyroscope rotors 10–1 and 10–2 have their scribe mark crossings transformed into direction cosines $m_{rst}$ and $n_{rst}$ for their spin axes which in turn are used to derive signals representing the spin axis orientation by direction cosines in the vehicle deck coordinate system $m_{uvw}$ and $n_{uvw}$, as represented by blocks 71–1 and 71–2, by the data processing described above. It is necessary to transform the direction cosines into inertial coordinates. The balanced gyroscopes rotor 10–3 and 10–4 each are somewhat analogous to stable platforms in that they retain their fixed orientation relative to space for a long period of time without significant drift. When the rotor spin axes are measured relative to the read-out ports, what actually occurs is that the vehicle desk attitude relative to the inertial space fixed spin axes is measured. Computers 71–3 and 71–4 derive the direction cosines signals for this data in the same way as 71–1 and 71–2. It is usually not convenient to align the spin axes 10–3 and 10–4 with the celestial coordinate axes. Accordingly, a phantom inertial coordinate system is used. A convenient set of coordinate axes is formed by a first axis taken as $\bar{a}$ along the 10–4 spin axis, a second axis $\bar{b}$ taken in the plane of the spin axes of 10–3 and 10–4 orthogonal to $\bar{a}$, and the third axis $\bar{c}$ is taken as orthogonal to $\bar{a}$ and $\bar{b}$ to form a right hand set. Computer 72 produces these phantom coordinate signals. In computer 73 the orientations of the vehicle phantom inertial frame relative the vehicle coordinates and of vehicle coordinates relative to celestial inertial frame are combined to give the vehicle axes in the celestial frame. These signals, in addition to their direct value for attitude control and guidance, are used in computer 74 to transform the signals from pendulous gyroscope rotors into a form useful for deriving the specific force $\bar{Q}$ in inertial space. In general, the signals derived from pendulous gyroscopes are not useful unless they are related to inertial space coordinates through a determination of deck attitude.

Figure 8:
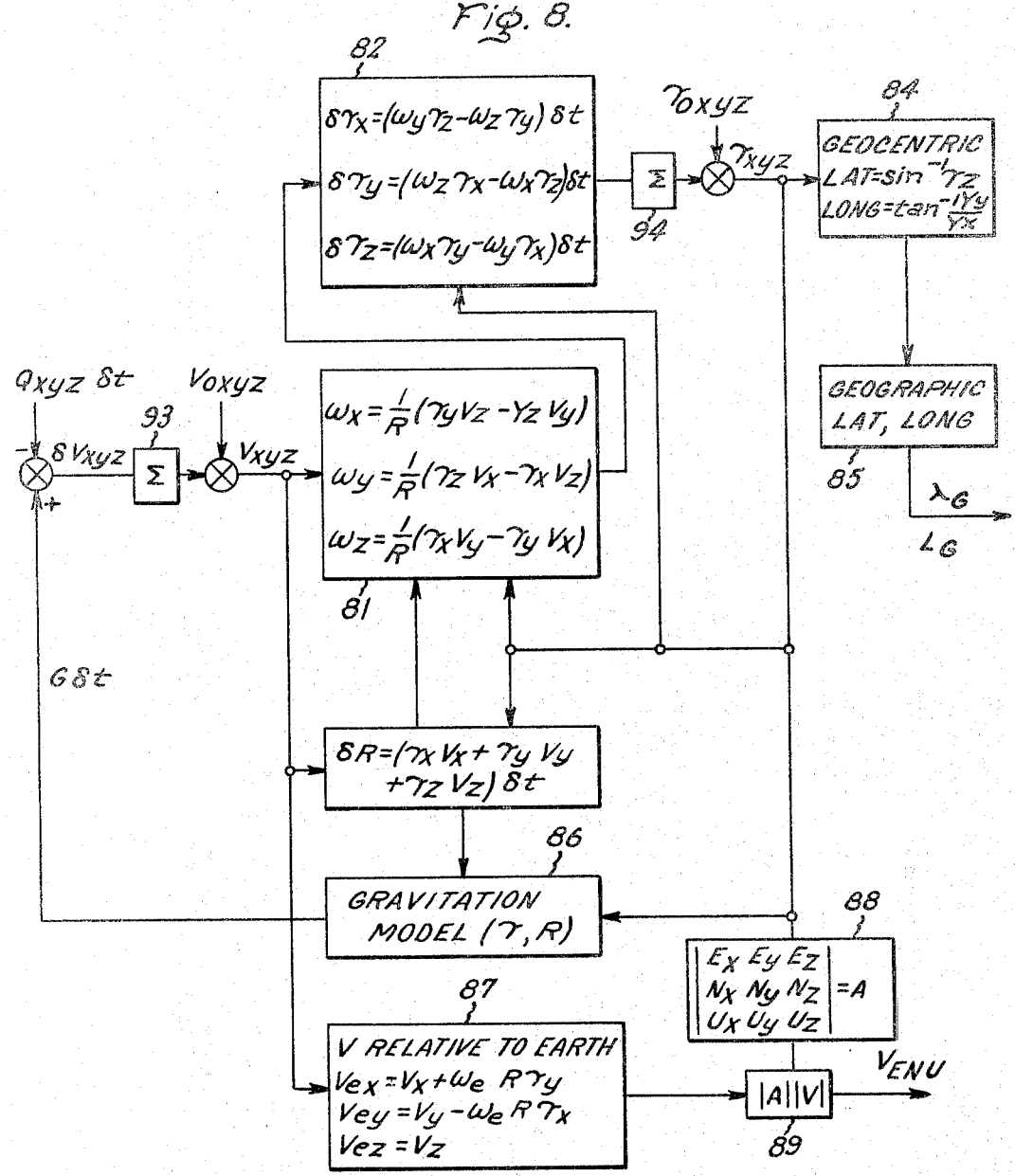
FIGURE 8 is a flow diagram of inertial computations for the FIGURE 7 sensors.

FIGURE 8 is a block diagram illustrating a series of computations for deriving vehicle displacements in celestial inertial coordinates based on the center of the earth from the measured quantities made available by the FIGURE 7 apparatus. It is particularly well suited for aircraft navigation because the trigonometric information is in the form of direction cosine signals requiring only algebraic equations directly mechanized by digital computation until the final calculation of latitude and longitude. For other applications, it will be understood that other forms of calculations can be more suitable.

The unit vector coordinates selected are $\alpha, \beta, \gamma$ where $\gamma$ is taken along the geocentric vertical. Because the general Newtonian relationships upon which the inertial navigation system relies are linear only in non-rotating coordinate systems, the use of rotating coordinate system necessitates the introduction of coordinate transformation factors, commonly known as "Coriolis" effects. Therefore:

$$\overline{V} = \frac{d\overline{R}}{dt} = \overline{\omega}_{oc} \times \overline{R} + \dot{\overline{R}}\overline{\gamma}$$

where $\overline{R}$ is the vehicle position vector and $\omega_{oc}$ is the computer frame angular velocity relative to the inertial axes.

$$\overline{\gamma}_x \overline{V} = \overline{\gamma}_x(\omega_{oc} \times \overline{R}) + \overline{\gamma}_x \dot{\overline{R}}\overline{\gamma}$$
$$= \overline{\gamma}_x(\overline{\omega}_{oc} \times \overline{R})$$
$$= (\overline{\gamma} \cdot \overline{R})\overline{\omega}_{oc} - (\overline{\gamma} \cdot \overline{\omega}_{oc})\overline{R}$$
$$= \overline{R}\overline{\omega}_{oc} \quad (\text{because } \overline{\gamma} \cdot \overline{\omega}_{oc} = 0)$$

Also, $$\overline{\gamma} \cdot \overline{V} = \overline{\gamma} \cdot (\overline{\omega}_{oc} \times \overline{R}\overline{\gamma}) + \overline{\gamma} \cdot \dot{\overline{R}}\overline{\gamma}$$
$$= \dot{R}$$

$$\overline{V} = v_x \overline{x} + v_y \overline{y} + v_z \overline{z}$$
$$\overline{\gamma} = \gamma_x \overline{x} + \gamma_y \overline{y} - \gamma_z \overline{z}$$
$$\omega_{oo} = \omega_x \overline{x} + \omega_y \overline{y} + \omega_z \overline{z}$$
$$\frac{d\overline{\gamma}}{dt} = \dot{\gamma}_x \overline{x} + \dot{\gamma}_y \overline{y} + \dot{\gamma}_z \overline{z}$$

(as before, $\dot{\overline{x}} = \dot{\overline{y}} = \dot{\overline{z}} = 0$).

Substituting these in the equation for $\overline{\gamma} \times \overline{v}$ yields:

$$\omega_x = \frac{1}{R}(\gamma_y v_z - \gamma_z v_y)$$
$$\omega_y = \frac{1}{R}(\gamma_z v_x - \gamma_x v_z)$$
$$\omega_y = \frac{1}{R}(\gamma_x v_y - \gamma_y v_x)$$

These give the computer frame rotation rates in terms of $\overline{V}$ where $\overline{\gamma}$ is generated by a feedback process.

The specific force components of $Q\Delta t$ are combined with signals from a gravitational model 86 and with the former velocity components of $V_0$, and then introduced in matrix computer 81 to solve for the components $\overline{\omega}_{oc}$. These quantities are then used to generate the components of $\overline{\gamma}$ in matrix computer 82 by mechanizing the component equations of $\dot{\overline{\gamma}} = \overline{\omega}_{oc} x \overline{\gamma}$.

These operations essentially transform the measured linear navigational velocities quantities in inertial rectangular coordinates $Q_{xyz}$ into angular velocities of the local $\alpha, \beta, \gamma$ frame in terms of $R, \omega_{xyz}$. Because the input incremental values are continuously summed in adder 93, the values utilized in matrix computer 81 are velocity quantities. Similarly, matrix computer 82 and adder 94 produce spherical displacement data through a second integration and feedback. From initial inertial conditions $\gamma_{0xyz}$, the spherical position data in $R, \omega_{xyz}$ is transformed into latitude and longitude type coordinates in geocentric coordinate computer 84 and then correlated with the earth geography in geographic latitude and longitude computer 85 on the basis of time. It should also be noted that matrix A operating on the matrix $UVW_{xyz}$ yields the attitude of the body in geographical coordinates. Terrestial velocity data is derived from the inertial velocity data $V_{xyz}$ by introducing the effect of the earth's rotation in Coriolis computer 87 and by relating these modified velocities to geographical coordinates in transformation matrix computer 88 in accordance with computer 89 which derives the approximate matrix terms from the spherical displacement data fed back to matrix computer 82.

*Essentials of the non-constrained pendulous gyroscope*

FIGURES 1-8 illustrate a specific embodiment of a pendulous gyroscope and a specific embodiment of an inertial navigation system. It is evident that numerous major modifications can be made. Because any attitude measuring gyroscope having a spherical rotor can be modified to be a pendulous gyroscope in accordance with the present invention by adding a pendulous mass along the spin axis, it is natural, but unnecessary, to use accelerometers and two-axis balanced gyroscopes of the same type of construction. Particularly in body-bound navigation systems, this tends to result in instrumentation of compatible accuracy because both instruments basically rely on free rotor motion and spin axis read-out. It is believed obvious to those skilled in the art that the modification of the balanced electrostatic gyroscope described in connection with FIGURES 1A-1C can be applied to other two-axis gyroscopes such as those having their rotors magnetically, cryogenically, or mechanically (by gimbals, etc.) suspended without constraints on rotor precession.

In most applications, a spherical shape is preferred for the gyroscope rotor. This simplifies the suspension for two-axis non-constrained precession. However, with a conventional mechanical gimbal system, a convenient approach is to utilize a conventional motor driven rotor mounted in a gimbal can. As explained above, the gyroscope rotor precession rate is proportional to the applied specific force Q. Without restraints, the position of the spin axis is proportional to the time integral of the specific force. If the gimbal can be floated in a damping fluid, the spin axis precession rate is proportional to the integral of the applied specific force and the spin axis position is proportional to vehicle displacement, after feedback corrections for gravity.

It has been asserted above that two pendulous gyroscopes having equal scale factors will maintain the initial separation of their spin axes if not constrained. This can be shown most concisely with vector notation by considering the components of $\overline{k}_1$ and $\dot{\overline{k}}_2$ in the plane through $\overline{k}_1$ and $\overline{k}_2$, the difference being the rate at which the separation is changing. An axis in the plane of $\overline{k}_1$ and $\overline{k}_2$, 90° away from $\overline{k}_1$ is given by $(\overline{k}_1 \times \overline{k}_2) \times \overline{k}_1$. The component of $\dot{\overline{k}}_1$ along with axis is the component of $\dot{\overline{k}}_1$ in the plane $\overline{k}_1 \overline{k}_2$. It is $$[(\overline{k}_1 \times \overline{k}_2) \times \overline{k}_1] \cdot \left(\frac{P_1}{L_1}\right)_{k_1} [\overline{k}_1 \times \overline{Q}]$$
$$= \left(\frac{P_1}{L_1}\right)_{k_1} [\overline{k}_1 \cdot \overline{k}_1 \overline{k}_2 - \overline{k}_1 \cdot \overline{k}_2 \overline{k}_1] \cdot [\overline{k}_1 \times \overline{Q}]$$
$$= \left(\frac{P_1}{L_1}\right)_{k_1} [\overline{k}_2 \cdot (\overline{k}_1 \times \overline{Q})]$$
$$= \left(\frac{P_1}{L_1}\right)_{k_1} [-(\overline{Q} \times \overline{k}_1) \cdot \overline{k}_1]$$
$$= \left(\frac{P_1}{L_1}\right)_{k_1} [-\overline{Q} \cdot (\overline{k}_1 \times \overline{k}_2)]$$

Similarly the component of $\dot{\overline{k}}_2$ is found to be $$[(\overline{k}_1 \times \overline{k}_2) \times \overline{k}_2] \cdot \left(\frac{P_2}{L_2}\right)_{k_2} [\overline{k}_2 \times \overline{Q}]$$
$$= \left(\frac{P_2}{L_2}\right)_{k_2} [\overline{k}_2 \cdot \overline{k}_1 \overline{k}_2 - \overline{k}_2 \cdot \overline{k}_2 \overline{k}_1] \cdot [\overline{k}_2 \times \overline{Q}]$$
$$= \left(\frac{P_2}{L_2}\right)_{k_2} [-\overline{k}_1 \cdot (\overline{k}_2 \times \overline{Q})]$$
$$= \left(\frac{P_2}{L_2}\right)_{k_2} [-\overline{Q} \cdot (\overline{k}_1 \times \overline{k}_2)]$$

which is the same as that for $\dot{\overline{k}}_1$. Thus if the scale factors of the two gyroscopes $$\left(\frac{P_1}{L_1}\right)_{k_1} \text{ and } \left(\frac{P_2}{L_2}\right)_{k_2}$$

are equal, the spin axes maintain a constant separation angle.

For missions of short total duration the rotor speed control can consist only of bringing the rotors to the correct initial speed. For long missions, such as space missions, loitering aircraft flights, or applications where the guidance system runs continuously on an alert basis, speed control may be needed for two reasons: a relatively crude requirement, for best operation of the pulse shaping systems in the readout, and for control of rotor oblateness; and to keep acceptable separation of the spin axes of the pendulous gyroscopes.

It is not needed to maintain fixed scale factors of the gyroscopes. The speeds are continuously available from the readout signals and are used to compute the scale factors continuously.

Speed control may be obtained in three ways:

(a) By applying magnetic field from the spin-up coils. This will generally precess the gyroscopes and require subsequent gyro-compassing and leveling unless the attitude of the mounting case remains known.

(b) Through action of the suspension system, if suitably shaped by a timed filter, or run-out of the rotor. The same general requirement exists as for nutation damping of the pendulous gyroscopes, i.e., that the phase angle of the suspension servo be positive at the running speed.

(c) Through addition of a servo response sensitive to ellipticity of the rotor, that is to sum of gaps. An ellipticity of one microinch is more than sufficient.

Neither methods (b) or (c) have been found to apply precessing torques to the gyroscopes. Method (c) appears superior to (b) in causing no resonance points in the suspension transfer function.

A general statement of speed control requirements covering all missions is difficult. However three examples may provide an understanding of the factors involved.

The typical scale factor of a pendulous gyroscope is 1000 ft. per sec. per radian. A rocket launch to orbital speed of 24,000 ft. per sec. will precess the gyroscope through 24 radians. Thus a difference in scale factors of 2% in the worst configuration, where both gyroscopes precess in the same cone, will cause them to change their separation by ½ radian, which is tolerable. In the alert condition the gyroscopes may be oriented so that $\overline{m}$ lies nearly in the vertical while $\overline{n}$ cones in a nearly horizontal plane so that no difference in speed has a significant effect on their separation, regardless of duration of ready status. Thus the rotor speeds need be kept only within 2% so that they will be satisfactory for launch.

In land or sea applications, where the changes in velocity are low compared to 1000 ft. per sec., the gyroscopes may be given the vertical and horizontal orientations, in which differences in scale factor do not cause changes in separation angle. They will not depart significantly from this under vehicle accelerations.

Long duration aircraft applications impose the most stringent requirement for adjustment of speed, if not for control. The changes in velocity at take-off are of such magnitude that the gyroscopes, even though initially in the favorable vertical-horizontal orientations, may be precessed into an unfavorable situation where both are moving in the same cone. Under the subsequent $lg$ acceleration, persisting for many hours, the relative speeds of the two pendulous gyroscopes may need to be correct within about 0.1%. This may, however, be done by setting the initial speeds rather than by continuous speed control.

In most bodybound navigation systems accelerations or increments of velocity are measured explicitly along coordinate axes that rotate with the vehicle or mounting body. Each increment of velocity must be assigned in the computer to its proper direction in inertial space. If the angular rates of the body or its accelerations are high, or have appreciable components of power in a high frequency spectrum, then the velocity increments and body orientations must be sampled and recorded frequently and with high per unit accuracy. The operations are not commutative.

In the system here described the situation is entirely different. The first order integration of accelerations to velocities is performed by the precession of the pendulous gyroscopes in the inertial frame, rather than in the computer, so that they are automatically summed in stable coordinates. The angular rates of the mounting body do not enter into the process, and have no influence on how often the data sampling must be done. The vehicle velocities are nearly unique functions of the directions of the pendulous gyroscopes in inertial axes, and for practical purposes the sampling needs to be done only when knowledge of velocity is required for output.

Suppose the vehicle to be subjected to an acceleration impulse in the $x$ direction, causing both pendulous gyroscopes to precess in cones about the $x$ axis, and then to be subjected to an equal impulse in the $(-x)$ direction. Regardless of the time history of the accelerations, the gyroscopes will retrace their paths. Subsequently if the gyroscope positions are read against the inertial frame supplied by the balanced gyroscopes, they will indicate no net change in velocity, regardless of whether intermediate samplings were made or not. In contrast a conventional system would have needed to record the full history of accelerations and body directions to know the same answer with certainty.

Figure 9:
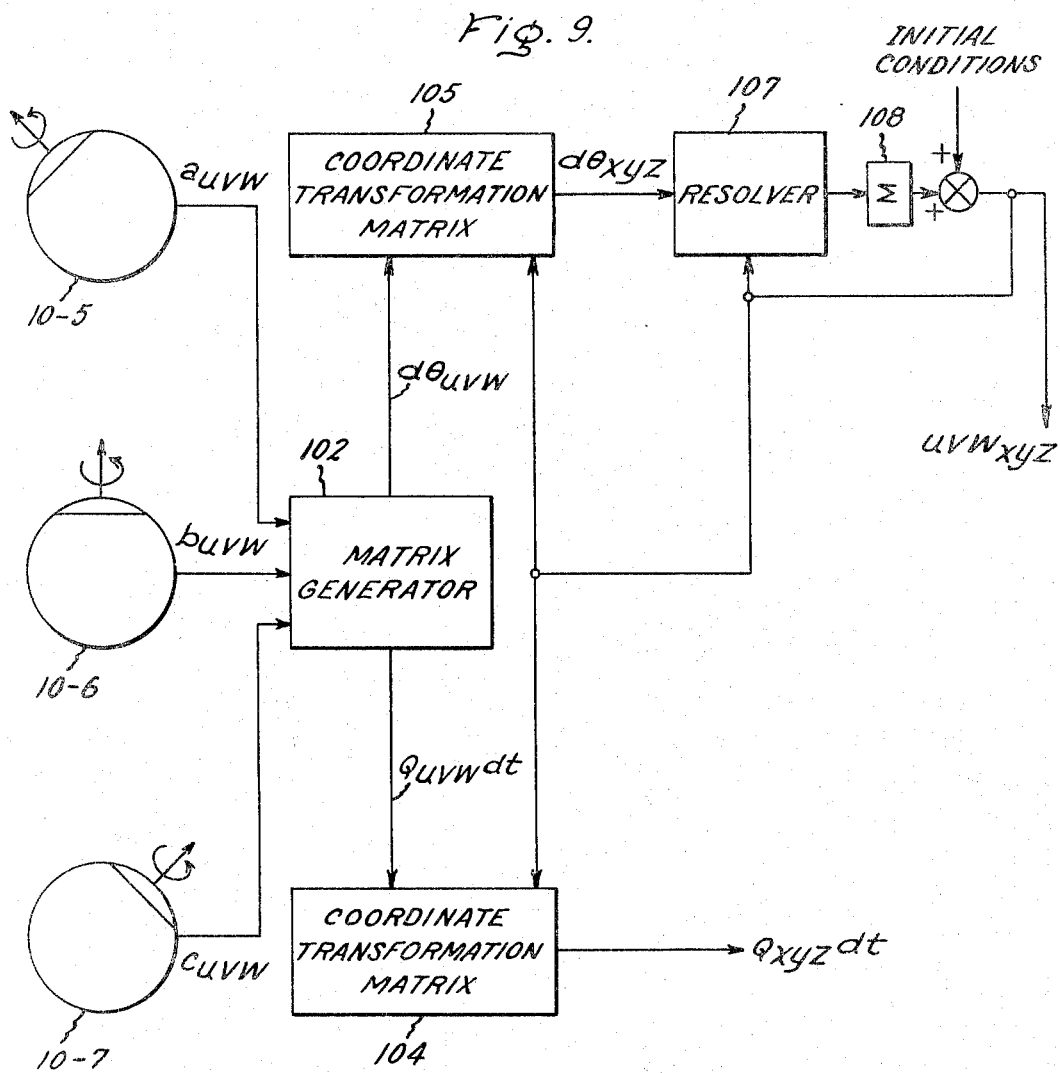
FIGURE 9 illustrates another embodiment of the invention wherein three pendulous gyroscopes are utilized to provide inertial signals in three dimensions for both linear motion and attitude.

FIGURE 9 embodiment

FIGURE 9 is a block diagram illustrating an example of an alternative embodiment of a navigation system. Three pendulous gyroscopes are utilized to obtain both displacement data and attitude data. This requires three pendulous gyroscopes 10–5, 10–6, 10–7 having different scale factors so that the different scale of reactions to rotations can provide data for extracting angular displacements. As noted above, if a pair of non-constrained pendulous gyroscopes having equal scale factors are given an initial spin axis displacement angle, this angle remains constant. That is, whatever specific force is applied to the pendulous gyroscopes, they will "cone" about each other's spin axis with a fixed cone angle. This characteristic has been relied on only to insure spin axis misalignment so as to obviate a blind measuring direction along parallel spin axes. Otherwise scale factor differences would be allowed for in the computations. Also, pendulous gyroscopes which are non-constrained are insensitive to rotations of their housings. Because of these factors, the inertial navigation system can utilize the knowledge of the gravitational field to distinguish between a change in direction of a specific force Q and the rotation of the vehicle $\omega_{uvw}$.

Accordingly, the three pendulous gyroscopes 10–5, 10–6, 10–7 are used. The spin axes orientations are readout as $a_{uvw}$, $b_{uvw}$, $c_{uvw}$ respectively together with the differential changes da, db, and dc in the usual manner in vehicle coordinates and applied to matrix generator 102.

As indicated before, for high spin velocities, the spin axis motion for non-constrained pendulous gyroscopes can be expressed as:

$$\dot{\bar{a}}_{xyz} = \frac{P_a}{L_a}(\bar{a} \times \overline{Q})$$

If $\dot{\bar{a}}$ is measured in a rotating body frame uvw, which has an angular velocity $\omega_{uvw}$ relative to the xyz frame, then $$\dot{\bar{a}}_{xyz} = \dot{\bar{a}}_{uvw} + \bar{\omega} \times \bar{a}$$

Therefore, $$\dot{\bar{a}}_{uvw} = \bar{a}_{uvw} \times \left(\frac{P}{L}Q_{uvw} + \bar{\omega}_{uvw}\right)$$

This results in three component equations for each gyroscope, yielding a total of nine equations which can be solved redundantly for $Q_\omega$, $Q_v$, $Q_w$, $\omega_\omega$, $\omega_v$, $\omega_w$, provided that $P_a/L_a$, $P_b/L_b$, $P_c/L_c$ are different.

The observed direction cosines of the three gyroscopes $a$, $b$, $c$ in the body axes $uvw$, and the changes in $a$, $b$, $c$ between sampling instants are the inputs to matrix generator 102. They are used as coefficients in the 9 equations $$a_v\left(\frac{1}{K_a}Q_w dt + d\theta_w\right) - a_w\left(\frac{1}{K_a}Q_v dt + d\theta_v\right) = da_u \text{ etc.}$$

of which 6 are solved simultaneously for the increments $Qdt$ and the increments of rotation $d\theta$ of the body relative to inertial space. These quantities are resolved in body axes.

In coordinate transformation matrices 104 and 105 the increments are resolved in inertial axes $xyz$, using a rotation matrix $uvw_{xzy}$, which is later derived.

Increments of $u$, $v$, $w$, resolved in $xyz$ axes, are formed in resolver 107 by taking the vector cross product of the rotation $d\theta$ with $u$, $v$, $w$. The increments are summed in integrator 108 and combined with constants of integration to give $u$, $v$, $w$ in $xyz$ axes. The elements of this forms the matrix used in the resolving process carried out in matrices 104 and 105.

The outputs are $uvw_{xyz}$ and $Qdt_{xyz}$, which are the inputs required by the navigation system as previously described.

While particular embodiments of the invention have been shown and described herein, it is not intended that the invention be limited to such disclosure, but that changes and modifications can be made and incorporated within the scope of the claims. For example, while the invention has been described as applied to "navigation" systems, it is to be understood that pendulous gyroscopes in accordance with the present invention may be used in any position measuring application such as surveying, etc.

What is claimed is:

1. A linear acceleration sensing gyroscope comprising:
   (a) a spherical inertial rotor element adapted for rotation about a spin axis;
   (b) means to provide a mass imbalance in said rotor along the spin axis;
   (c) electromagnetic suspension means for freely supporting said rotor for rotation about its spin axis and about its center of symmetry;
   (d) readout means for measuring the orientation of said spin axis; and
   (e) said rotor element being mounted for free precession without any restraints.

2. The gyroscope of claim 1 wherein said rotor element has a conductive surface and is positioned between pairs of electrostatic suspension plates.

3. Displacement sensing apparatus comprising:
   (a) a pair of pendulous gyroscopes having non-parallel spin axes, each gyroscope including:
       (1) a pendulous rotor,
       (2) means freely suspending said rotor for uncontrolled precession, and
       (3) readout means for producing signals representing the orientation of the spin axis of said rotor; and
   (b) velocity computer means for implementing solutions of the set of simultaneous component equations derived from the inertial relationships $$\bar{k}_1 = \left(\frac{P_1}{L_1}\right)(\bar{k}_1 \times \bar{Q})$$

$$\bar{k}_2 = \left(\frac{P_2}{L_2}\right)(\bar{k}_2 \times \bar{Q})$$

wherein $k$ is the unit vector along the pendulous rotor spin axis, P is the pendulous moment, L is the rotor angular momentum, Q is the specific force measured, and the subscripts 1 and 2 indicate the respective rotors.

4. An integrating two-axis pendulous gyroscope for sensing liner accelerations comprising:

(a) a spherical rotor having
       (1) an electrically conductive surface,
       (2) symmetrical mass distribution about a spin axis,
       (3) mass imbalance along the spin axis providing a pendulous moment,
       (4) mass concentrated in a ring about the equator providing a preferred axis of rotation, and
       (5) indicia on the rotor surface indicative of the rotor spin axis;
   (b) a housing;
   (c) electrostatic suspension electrodes, mounted in said housing for supporting said rotor for near frictionless rotation; and
   (d) optical readout means for sensing said indicia.

5. A body-bound navigation system for measuring the displacement and attitude of a vehicle or element comprising:
   (a) attitude sensing means for measuring the orientation of a portion of vehicle relative to inertial space;
   (b) a pair of pendulous gyroscopes having non-parallel spin axes, each gyroscope including:
       (1) a pendulous rotor,
       (2) means freely suspending said rotor for unconstrained precession, and
       (3) readout means for producing signals representing the orientation of the spin axis of said rotor;
   (c) velocity computer means for implementing solutions of the set of simultaneous component equations derived from the inertial relationship $$\bar{k}_1 = \left(\frac{P_1}{L_1}\right)(\bar{k}_1 \times \bar{Q})$$

$$\bar{k}_2 = \left(\frac{P_1}{L_2}\right)(\bar{k}_2 \times \bar{Q})$$

wherein $k$ is the unit vector along the pendulous rotor spin axis, P is the pendulous moment, L is the rotor angular momentum, Q is the specific force being measured, and the subscripts 1 and 2 indicate the respective rotors;

(d) matrix computer means, responsive to said velocity computer means, for continuously solving the component equations derived from the vector equation $$\bar{\omega}_{oo} = \bar{\gamma} \times \frac{\bar{V}}{R}$$

wherein $\bar{\omega}_{oo}$ is the angular velocity of the navigation system relative an inertial frame centered on the earth's center, $\gamma$ is a unit vector along the geocentric vertical, and R is the distance to the earth's center;

(e) matrix computer means, responsive to said matrix computer means for computing angular velocity components, for continuously solving the component equations derived from the vector equation and $$\dot{\bar{\gamma}} = \omega_{oo} \times \bar{\gamma}$$

(f) displacement information means for continuously summing signals representing changes in the geocentric vertical, $\bar{\gamma}$, whereby navigation data relative to a terrestial coordinate system is made available.

References Cited

UNITED STATES PATENTS

| | | | |
|---|---|---|---|
| 2,461,521 | 2/1949 | Clopton | 74—5.6 |
| 2,691,306 | 10/1954 | Beams et al. | 74—5.6 |
| 2,919,583 | 1/1960 | Pasker | 74—5 |
| 3,226,984 | 1/1966 | Humphrey | 74—5.6 |

FRED C. MATTERN, JR., *Primary Examiner.*

MILTON KAUFMAN, *Examiner.*

T. W. SHEAR, J. PUFFER, C. J. HUSAR,
*Assistant Examiners.*

UNITED STATES PATENT OFFICE
CERTIFICATE OF CORRECTION

Patent No. 3,355,953                                December 5, 1967

Frithiof V. Johnson

It is hereby certified that error appears in the above numbered patent requiring correction and that the said Letters Patent should read as corrected below.

Column 13, lines 55 and 56, for "uncontrolled" read -- unconstrained --; line 71, for "specific force measured" read -- specific force being measured --; line 75, for "liner" read -- linear --; column 14, line 29, for "relationship" read -- relationships --; line 55, strike out "and" and insert the same after the equation in lines 56 and 57, same column 14.

Signed and sealed this 7th day of January 1969.

(SEAL)
Attest:

Edward M. Fletcher, Jr.                          EDWARD J. BRENNER
Attesting Officer                                    Commissioner of Patents